US012722811B2

(12) United States Patent
Xiao et al.

(10) Patent No.: US 12,722,811 B2
(45) Date of Patent: Sep. 1, 2026

(54) AIRCRAFT

(71) Applicant: SZ DJI TECHNOLOGY CO., LTD., Shenzhen (CN)

(72) Inventors: Xiang Xiao, Shenzhen (CN); Qiankun He, Shenzhen (CN); Quanlei Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 148 days.

(21) Appl. No.: 18/892,001

(22) Filed: Sep. 20, 2024

(65) Prior Publication Data

US 2026/0091890 A1 Apr. 2, 2026

Related U.S. Application Data

(63) Continuation of application No. PCT/CN2022/088245, filed on Apr. 21, 2022.

(51) Int. Cl.
*B64U 10/14* (2023.01)
*B64U 20/50* (2023.01)
*B64U 101/30* (2023.01)

(52) U.S. Cl.
CPC ............ *B64U 10/14* (2023.01); *B64U 20/50* (2023.01); *B64U 2101/30* (2023.01)

(58) Field of Classification Search
CPC ..... B64U 10/14; B64U 20/50; B64U 2101/30
See application file for complete search history.

(56) References Cited

U.S. PATENT DOCUMENTS

| | | | | |
|---|---|---|---|---|
| 9,594,381 | B1 * | 3/2017 | Clark | E04H 15/50 |
| 9,632,509 | B1 * | 4/2017 | Aphek | G05D 1/102 |
| 9,778,661 | B2 * | 10/2017 | Wang | G06T 7/73 |
| 9,798,322 | B2 * | 10/2017 | Bachrach | G05D 1/0094 |
| 10,776,939 | B2 * | 9/2020 | Ma | G06T 7/596 |
| 11,106,203 | B2 * | 8/2021 | Huang | G01B 11/22 |
| 11,378,959 | B1 * | 7/2022 | Nielsen | G05D 1/101 |

(Continued)

FOREIGN PATENT DOCUMENTS

| | | |
|---|---|---|
| CN | 203461110 U | 3/2014 |
| CN | 205837182 U | 12/2016 |

(Continued)

OTHER PUBLICATIONS

International Search Report for PCT/CN2022/088245 issued on Oct. 27, 2022.

*Primary Examiner* — Joshua D Huson
*Assistant Examiner* — Valentina Xavier

(57) ABSTRACT

An unmanned aerial vehicle (UAV) includes: a body including a nose and a tail opposite to the nose; a plurality of rotor devices respectively mounted on the body; and a rear obstacle avoidance sensor mounted on a top part of the body, the UAV has a backward flight state of flying in a direction towards the tail and a hover state of stably hovering in a wind-free environment; in the hover state, the body is tilted in a length direction relative to a horizontal direction, so that the nose is higher than the tail; the optical axis of the rear obstacle avoidance sensor is tilted at a greater angle relative to the horizontal direction when the UAV is in the hover state compared to the backward flight state. It can improve the flight efficiency, enhance the overall obstacle avoidance function, and improve the flight experience.

19 Claims, 6 Drawing Sheets

(56) References Cited

U.S. PATENT DOCUMENTS

| | | | | |
|---|---|---|---|---|
| 11,455,895 | B2 * | 9/2022 | Henry | G08G 5/21 |
| 11,543,519 | B2 * | 1/2023 | Roberts | G08G 5/57 |
| 12,066,826 | B2 * | 8/2024 | Nielsen | G05D 1/101 |
| 2013/0006448 | A1 * | 1/2013 | Callou | A63H 27/12<br>701/5 |
| 2015/0160658 | A1 * | 6/2015 | Reedman | G05D 1/102<br>701/3 |
| 2019/0233099 | A1 * | 8/2019 | Lindsey | G05D 1/0816 |
| 2020/0023995 | A1 * | 1/2020 | Song | B64D 45/00 |
| 2020/0064868 | A1 * | 2/2020 | Rosen | G05D 1/0858 |
| 2021/0004003 | A1 * | 1/2021 | Gury | B64U 20/87 |
| 2024/0046803 | A1 * | 2/2024 | Keshmiri | G08G 5/21 |
| 2024/0199244 | A1 * | 6/2024 | Obermayr | B64U 20/70 |

FOREIGN PATENT DOCUMENTS

| | | | | |
|---|---|---|---|---|
| CN | 206407103 | U | 8/2017 | |
| CN | 206407117 | U | 8/2017 | |
| CN | 206684581 | U | 11/2017 | |
| CN | 206954489 | U | 2/2018 | |
| CN | 207403934 | U | 5/2018 | |
| CN | 207644617 | U | 7/2018 | |
| CN | 109159895 | A | 1/2019 | |
| CN | 208963300 | U | 6/2019 | |
| CN | 210162256 | U | 3/2020 | |
| CN | 210310879 | U | 4/2020 | |
| CN | 213443082 | U | 6/2021 | |
| CN | 213814412 | U | 7/2021 | |
| CN | 214824100 | U | 11/2021 | |
| KR | 102775000 | B1 * | 3/2025 | G05D 1/617 |
| WO | WO-2017060782 | A1 * | 4/2017 | B64U 10/14 |
| WO | WO-2021050161 | A2 * | 3/2021 | G05D 1/46 |
| WO | WO-2024021135 | A1 * | 2/2024 | G05D 1/498 |

* cited by examiner

AIRCRAFT

RELATED APPLICATIONS

This application is a continuation application of PCT application No. PCT/CN2022/088245, filed on Apr. 21, 2022, and the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to the technical field of aircrafts, and in particular to an unmanned aerial vehicle.

BACKGROUND

As users increasingly pursue the ultimate user experience, their demands for the performance of unmanned aerial vehicles (UAVs) are also rising. For instance, to enhance the safety of UAVs, an increasing number of UAVs are incorporated with the visual obstacle avoidance technology. To facilitate portability, transportation, and storage, more and more UAVs are adopting the foldable arm technology. Additionally, to achieve aerial photography, a growing number of UAVs are integrated with the gimbal camera aerial photography technology.

In the existing visual obstacle avoidance technology, the triangulation function of binocular cameras is commonly employed to detect obstacles, achieving environmental perception. However, the current range of detection for existing binocular cameras is limited, and the field of view of these cameras is prone to being obstructed by robotic arms or propellers, thereby affecting the effectiveness of visual obstacle avoidance. Present UAVs, especially those with foldable arms, still maintain a relatively large volume, impacting the convenience of carrying, transporting, and storing the UAVs. In the aerial photography scenarios of current UAVs, there is a general requirement for the gimbal camera to capture a maximized range to meet various aerial photography needs.

SUMMARY

To address the limitations in the visual obstacle avoidance effectiveness, the retained large volume after arm folding, and constrained aerial photography effects in existing technologies, some embodiments of this disclosure introduces an unmanned aerial vehicle (UAV) as follows.

In one aspect, some embodiments of this disclosure provide an aircraft, including: a body, including a nose and a tail opposite to the nose; a driving power device, coupled to the body to provide driving power; and a sensor, mounted on the body and configured to detect in a flight direction of the aircraft, where in response to a horizontal flight state instruction, the driving power device provides a first flight power to enable the aircraft to fly in a horizontal direction, in response to a hover state instruction, the driving power device provides a second flight power to enable the aircraft to hover stably in an environment without wind interference, a tilt angle between an optical axis of the sensor and the horizontal direction when the aircraft is in a hover state is greater than a tilt angle between the optical axis of the sensor and the horizontal direction when the aircraft is in a horizontal flight state.

In another aspect, some embodiments of this disclosure provide an aircraft, including: a body, including a nose and a tail opposite to the nose; and a driving power device, coupled to the body to provide driving power, where in response to a horizontal flight state instruction, the driving power device provides a first flight power to enable the aircraft to fly in a horizontal direction, in response to a hover state instruction, the driving power device provides a second flight power to enable the aircraft to hover stably in an environment without wind interference, when the aircraft is in the hover state, in a roll axis direction the body is tilted relative to the horizontal direction to make the nose higher than the tail, the horizontal flight state includes a backward flight state and a forward flight state, and has at least one of the following features: a height difference between the nose and the tail in the backward flight state is larger than a height difference between the nose and the tail in the hover state, or a height difference between the nose and the tail in the forward flight state is smaller than the height difference between the nose and the tail in the hover state.

In some exemplary embodiments of this disclosure, due to the camera being connected to the body's nose via the gimbal, the camera is able to change the pitch angle thereof via the pitch shaft mechanism. In addition, an avoidance portion is provided above the camera on the nose. In the hover state, with the body tilted in the length direction relative to the horizontal direction and the nose being higher than the tail, the camera, driven by the gimbal, can capture images through the recess of the avoidance portion, thereby improving the camera's pitch shooting range. In this way, by coordinating the gimbal's setting manner with the UAV's state, the camera's pitch angle shooting range is expanded, thereby improving the camera's aerial photography performance.

The above description is only an overview of the technical solutions in this disclosure. To gain a clearer understanding of the technical means disclosed in this disclosure and to implement them based on the content of the description, specific embodiments of the disclosure are provided below to make the above and other objects, features, and advantages of this disclosure more apparent and understandable.

BRIEF DESCRIPTION OF THE DRAWINGS

In order to provide a clearer description of the technical solutions in the embodiments of this disclosure or in the existing technologies, a brief introduction to the drawings required in the description of the embodiments or the existing technologies will be given below. It is evident that the drawings presented in the following description are some embodiments of this disclosure, and a person skilled in the art can obtain additional drawings based on these drawings without exerting inventive efforts.

Figure 1:
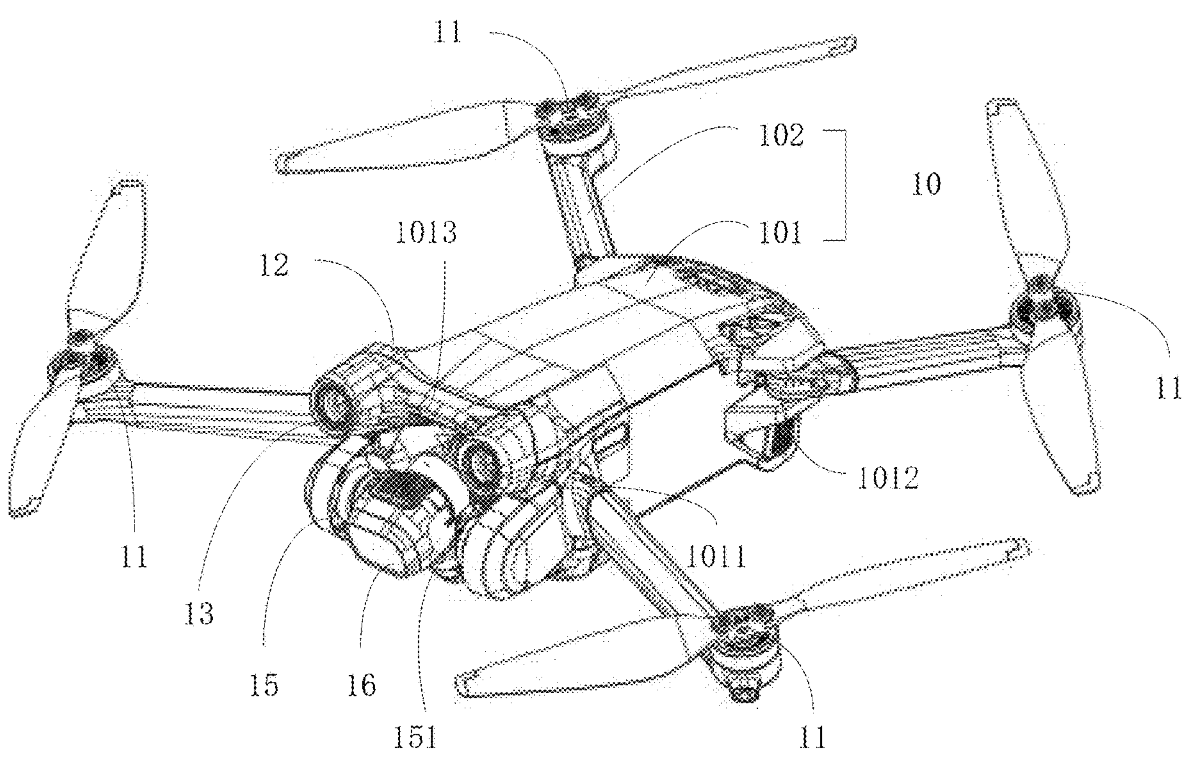
FIG. 1 schematically illustrates a structural diagram of a UAV in a flying state according to some exemplary embodiments of the present disclosure.

10—body, 101—central body, 1011—first mounting portion, 1012—second mounting portion, 1013—avoidance portion, 102—arm, 1021—front arm, 10211—left front arm, 10212—right front arm, 1022—rear arm, 10221—left rear arm, 10222—right rear arm, 103—support, 104—arc-shaped portion, 105—landing gear connection portion, 1051—front landing gear connection portion, 1052—rear landing gear connection portion, 106—battery case, 11—rotor device, 111—propeller blade, 112—left front rotor device, 113—right front rotor device, 114—left rear rotor device, 115—right rear rotor device, 116—rotation axis, 12—rear obstacle avoidance sensor, 13—front obstacle avoidance sensor, 14—bottom obstacle avoidance sensor, 15—gimbal, 151—pitch shaft, 16—camera, L—length direction, H—horizontal direction, a—first tilt angle, b—second tilt angle, F—nose, B—tail, D1—first optical axis, D2—second optical axis, D3—third optical axis, S1—first perception coverage area, S11—first upper boundary, S12—first lower boundary, S2—second perception coverage area, S21—second front boundary, S22—second rear boundary, S3—third perception coverage area, c—overlapping angle.

DETAILED DESCRIPTION

To provide a clearer and full description of the technical solutions in the embodiments of this disclosure and to better illustrate the purposes and advantages, the following detailed description will be combined with the accompanying drawings. It is evident that the described embodiments are part of the embodiments of this disclosure, not all of them. All other embodiments obtained by a person skilled in the art based on the embodiments in this disclosure without creative efforts fall within the scope of protection of this disclosure.

The terms "first," "second," etc., as used in the description and claims of this disclosure, can include or implicitly include one or more features unless explicitly stated otherwise. In the description of this disclosure, unless otherwise specified, the term "a plurality of" means two or more. Additionally, the use of "and/or" in the description and claims indicates at least one of the connected elements, and the character "/" generally implies an "or" relationship between the associated elements.

It should be understood that in the description of this disclosure, terms such as "center," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," "circumferential," and the like, indicating orientation or positional relationships, are based on the orientation or positional relationships shown in the drawings. These terms are used for ease of description and to simplify the disclosure, they do not necessarily imply that the device or elements must have a particular orientation, be constructed, or operated in a specific orientation. Therefore, these terms should not be construed as limiting the scope of this disclosure.

In the description of this disclosure, it should be noted that, unless explicitly specified and limited, terms such as "mounting," "connecting," and "linking" should be broadly interpreted. For example, this can include fixed connections, detachable connections, or integral connections; mechanical connections or electrical connections; direct connections or indirect connections via an intermediate medium; and communication within two parts. For a person skilled in the art, the specific meanings of these terms in this disclosure can be understood based on the specific circumstances.

Some exemplary embodiments of this disclosure provide a UAV that can be used as various unmanned aerial vehicles requiring folding, such as aerial photography UAVs, agricultural crop protection UAVs, surveying UAVs, and the like. In some exemplary embodiments of this disclosure, the UAV is exemplified as an agricultural crop protection UAV for illustration.

Reference can be made to the following figures, Top of Form

Figure 2:
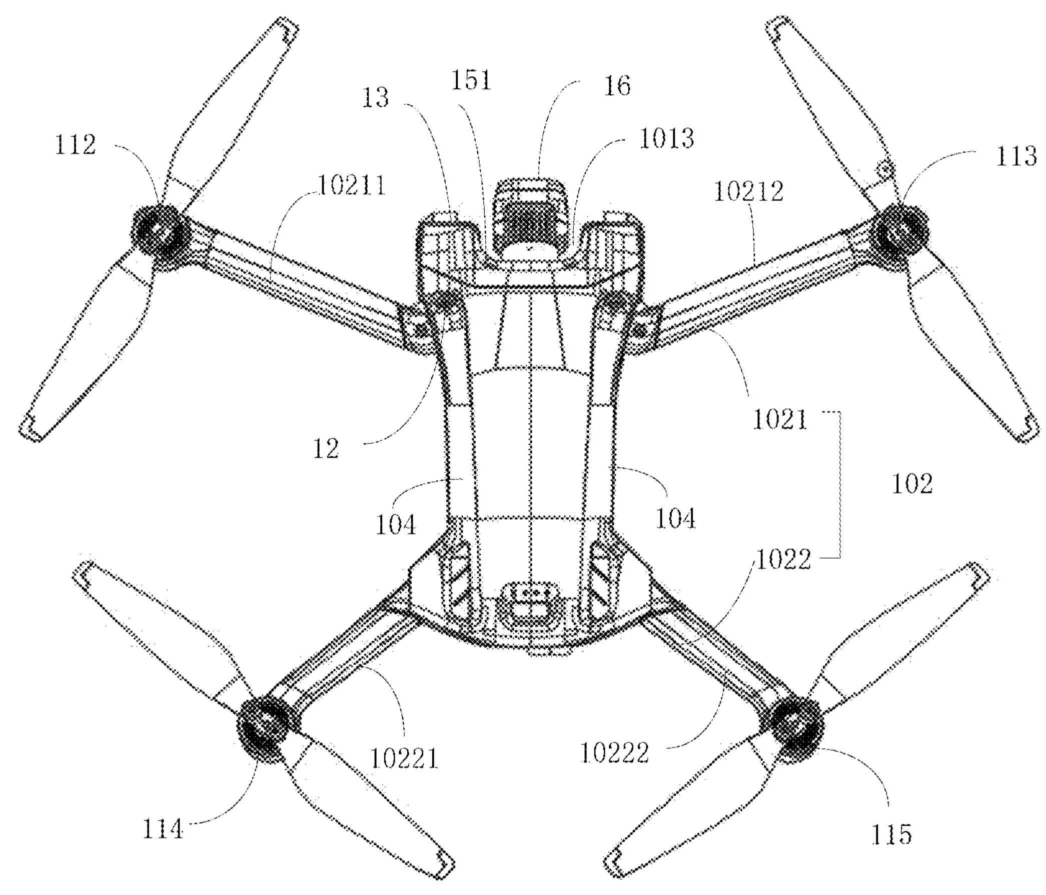
FIG. 2 schematically illustrates a top view structural diagram of the UAV shown in FIG. 1.
Figure 3:
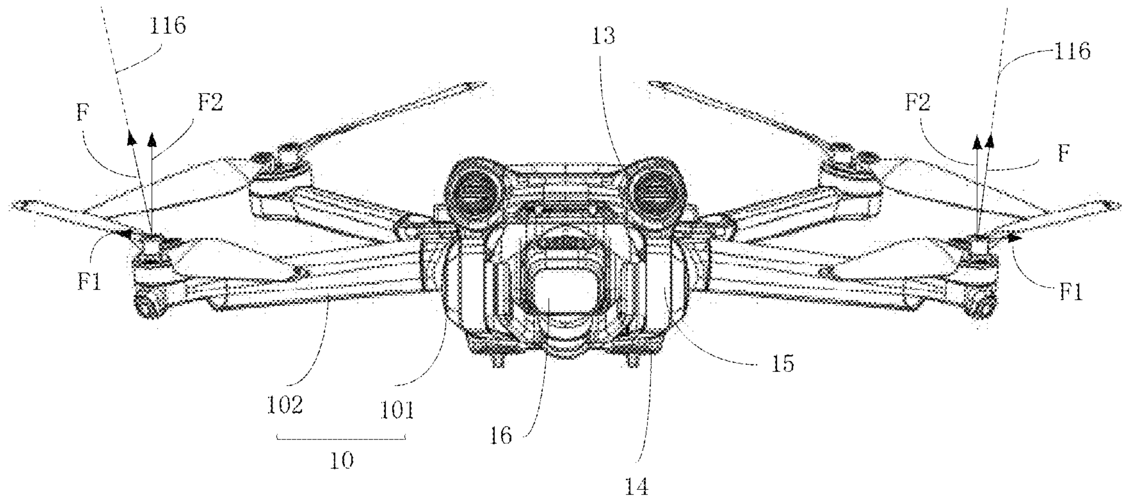
FIG. 3 schematically illustrates a front view structural diagram of the UAV shown in FIG. 1.
Figure 4:
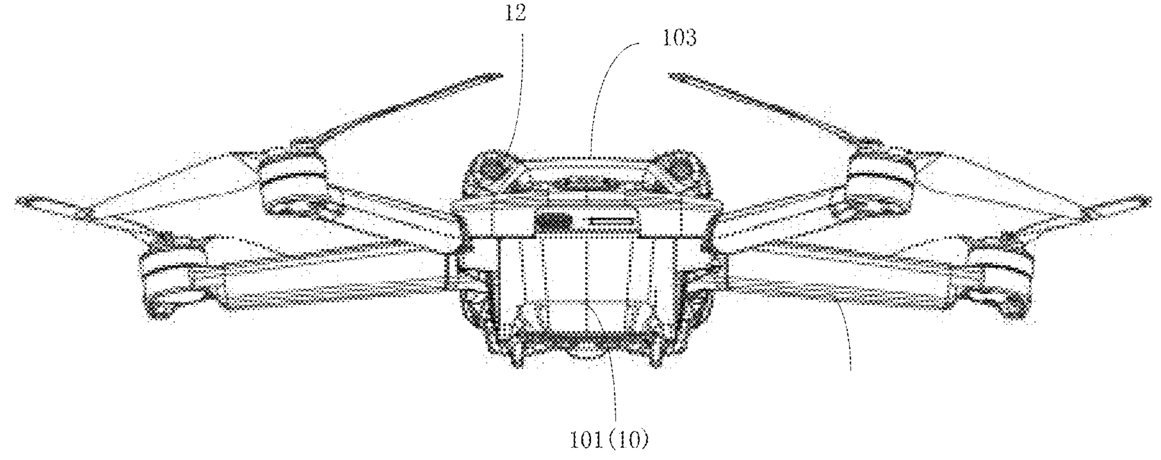
FIG. 4 schematically illustrates a rear view structural diagram of the UAV shown in FIG. 1.
Figure 5:
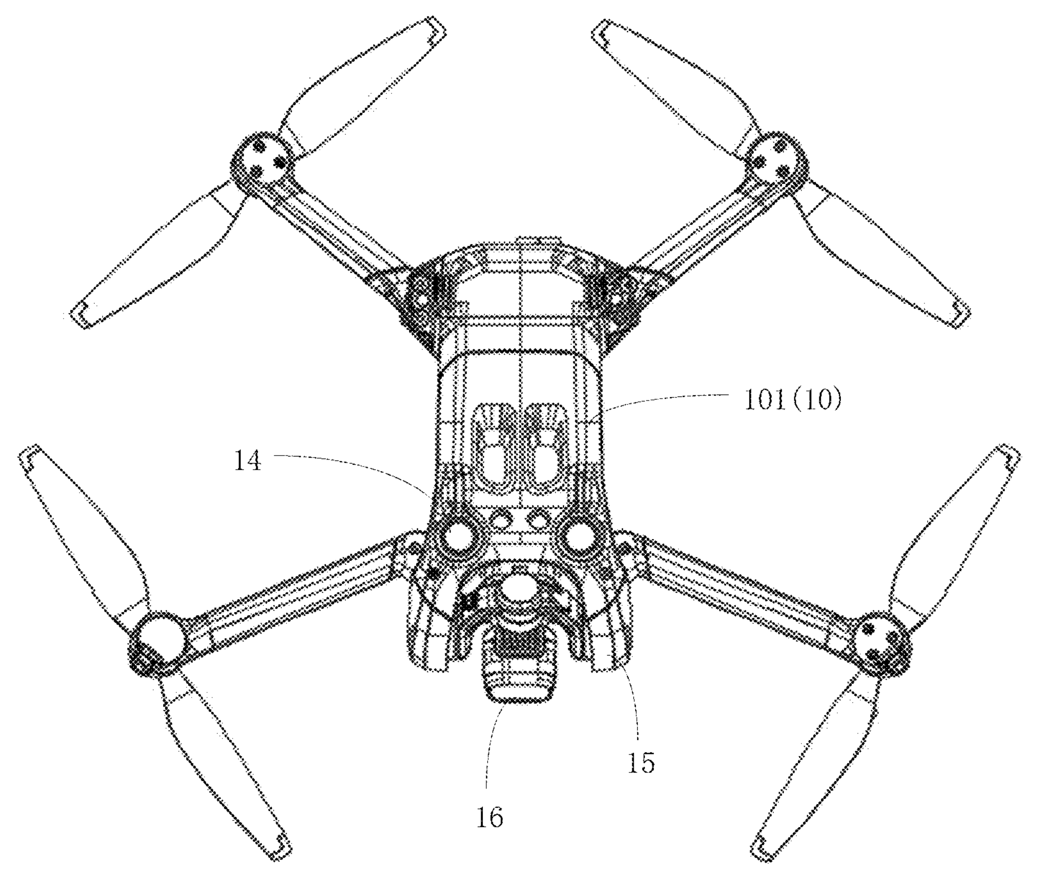
FIG. 5 schematically illustrates a bottom view structural diagram of the UAV shown in FIG. 1.
Figure 6:
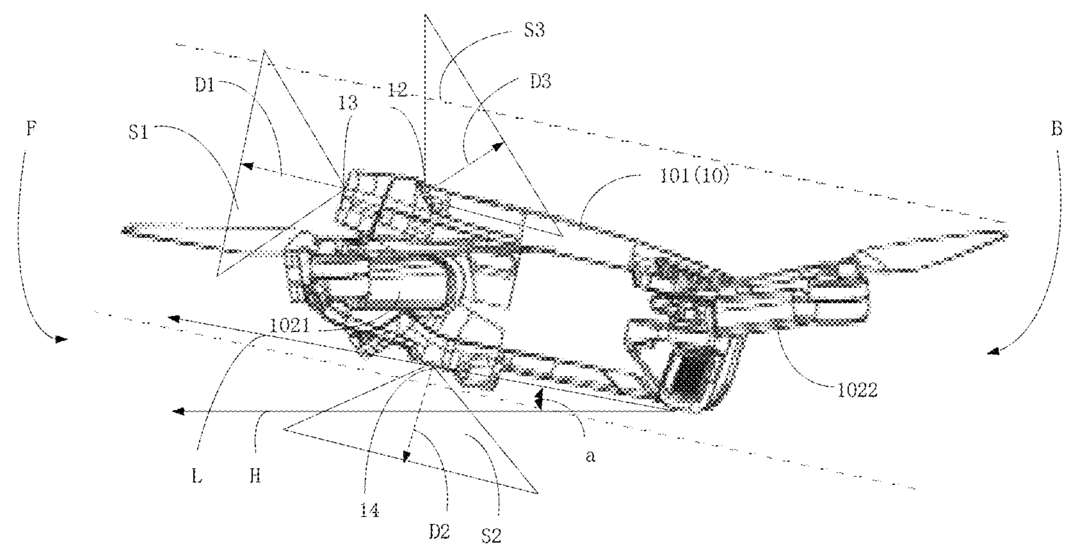
FIG. 6 schematically illustrates a structural diagram of the UAV shown in FIG. 1 in a hover state.
Figure 7:
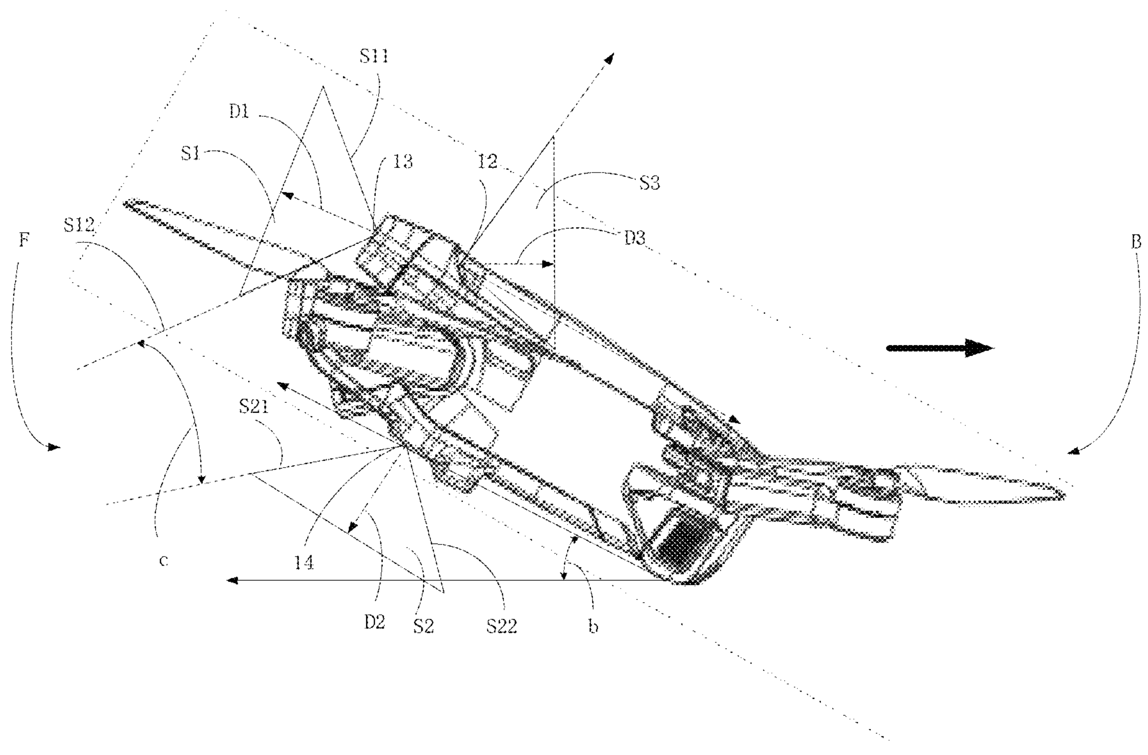
FIG. 7 schematically illustrates a structural diagram of the UAV shown in FIG. 1 in a backward flight state.
Figure 8:
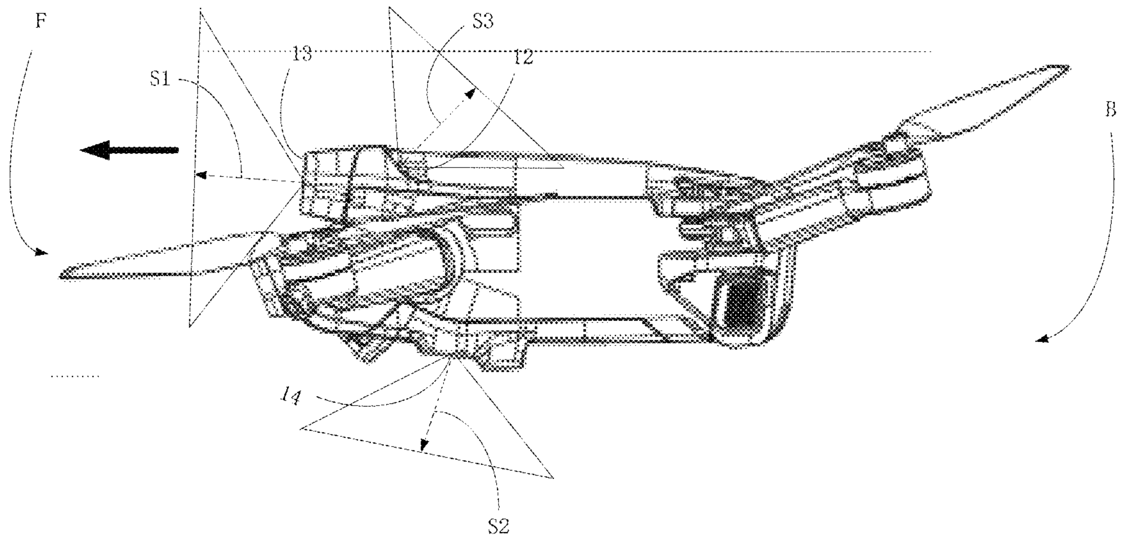
FIG. 8 schematically illustrates a structural diagram of the UAV shown in FIG. 1 in a forward flight state.
Figure 9:
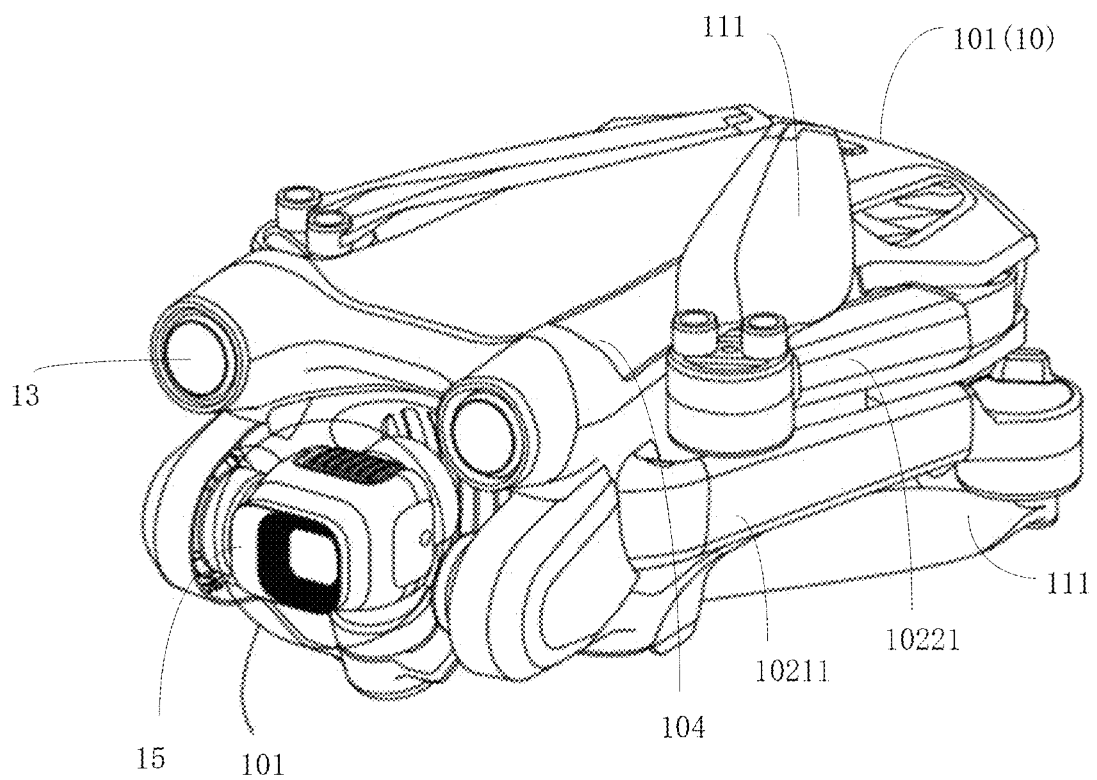
FIG. 9 schematically illustrates a structural diagram of the UAV shown in FIG. 1 in a folded state.
Figure 10:
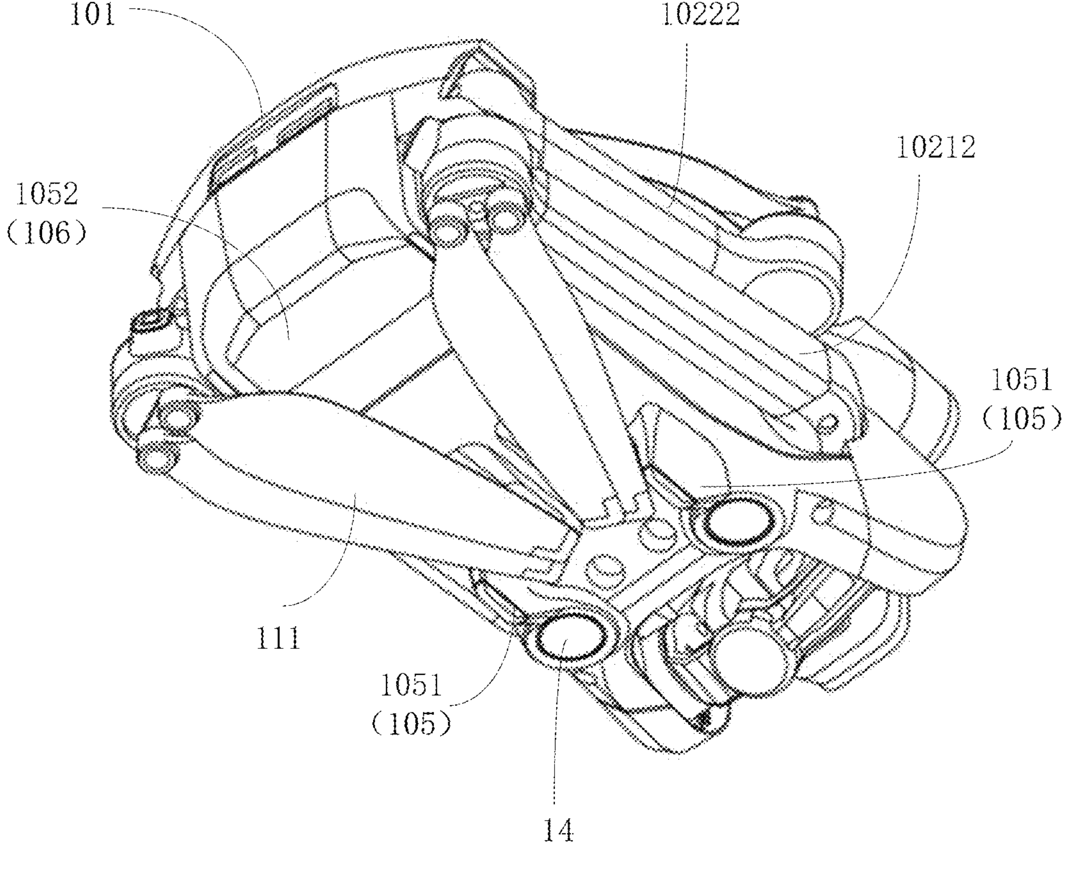
FIG. 10 schematically illustrates another structural diagram of the UAV shown in FIG. 1 in a folded state.

FIG. 1 illustrates a structural diagram of a UAV in a flying state according to some exemplary embodiments of the present disclosure; FIG. 2 illustrates a top view structural diagram of the UAV shown in FIG. 1; FIG. 3 illustrates a front view structural diagram of the UAV shown in FIG. 1; FIG. 4 illustrates a rear view structural diagram of the UAV shown in FIG. 1; FIG. 5 illustrates a bottom view structural diagram of the UAV shown in FIG. 1; FIG. 6 illustrates a structural diagram of the UAV shown in FIG. 1 in a hover state; FIG. 7 illustrates a structural diagram of the UAV shown in FIG. 1 in a backward flight state; FIG. 8 illustrates a structural diagram of the UAV shown in FIG. 1 in a forward flight state; FIG. 9 illustrates a structural diagram of the UAV shown in FIG. 1 in a folded state; and FIG. 10 illustrates another structural diagram of the UAV shown in FIG. 1 in a folded state.

Specifically, the UAV can include: Top of Forma body 10, including a nose F and a tail B opposite to the nose F; a plurality of rotor devices 11, respectively mounted on the body 10 and configured to provide a flight power; and a rear obstacle avoidance sensor 12, mounted on a top part of the body 10 and configured to detect obstacles in a direction of the tail B of the UAV, where the UAV has a backward flight state (as shown in FIG. 7) of flying in the direction of the tail B (as shown in the direction pointed by the broad arrow in FIG. 7) and a hover state (as shown in FIG. 6) of hovering stably under a windless condition; in the hover state, the body 10 is tilted in a length direction L relative to a horizontal direction H to make the nose F higher than the tail B; an optical axis of the rear obstacle avoidance sensor 12 has a greater tilt angle relative to the horizontal direction H when the UAV is in the hover state compared to the backward flight state.

In some exemplary embodiments of this disclosure, as the body 10 is tilted in the length direction L relative to the horizontal direction H in the hover state, the nose F becomes higher than the tail B; accordingly, the body 10 of the UAV can tilt backward by a certain angle relative to the horizontal direction H to reduce the resistance it encounters. Consequently, this design helps enhance the flight efficiency of the UAV. Additionally, by installing the rear obstacle avoidance sensor 12 on the top part of the body 10 and adjusting its optical axis to have a greater tilt angle relative to the horizontal direction H in the hover state compared to the backward flight state, the position of the rear obstacle avoidance sensor 12 can be optimized concerning the flight and hover attitude of the body 10. This configuration provides a larger obstacle avoidance view angle or a better directional angle for the rear obstacle avoidance sensor. Ultimately, this contributes to improving the overall obstacle avoidance functionality of the UAV and enhances the flight experience thereof.

As shown in FIG. 6, due to the installation of the rear obstacle avoidance sensor 12 on the top part of the body 10, when the UAV is in the hover state, the body 10 of the UAV can be tilted backward by a certain angle in the length direction L relative to the horizontal direction H. This allows the rear obstacle avoidance sensor 12 on the top part of the body 10 to better detect obstacles in the direction of the UAV's tail B, obtaining a larger obstacle avoidance view angle or a better directional angle.

As shown in FIG. 7, in the case where the UAV is in the backward flight state, the tilt angle of the obstacle avoidance sensor 12's detection direction relative to the horizontal direction H is smaller than the tilt angle relative to the horizontal direction H when the UAV is in the hover state. That is, in the case where the UAV is in the backward flight state, the angle between the detection direction of the rear obstacle avoidance sensor 12 and the horizontal direction H is relatively small. This is advantageous for the rear obstacle avoidance sensor 12 to better detect obstacles in the UAV's forward direction, thereby obtaining a larger obstacle avoidance view angle or a better directional angle and improving the UAV's obstacle avoidance capabilities.

In practical applications, the attitude of the body 10 is related to the angle between the optical axis of the rear obstacle avoidance sensor 12 and the length direction L of the body 10 relative to the horizontal direction H. Therefore, by adjusting the attitude of the body 10, especially the tilt angle of the length direction L of the body 10 relative to the horizontal direction H, the tilt angle between the optical axis of the rear obstacle avoidance sensor 12 and the horizontal direction H can be adjusted, such that the optical axis of the rear obstacle avoidance sensor 12 has a greater angle relative to the horizontal direction H when the UAV is in the hover state compared to the backward flight state.

Exemplarily, as shown in FIG. 7, when the UAV is in the hover state, the tilt angle of the length direction L of the body 10 relative to the horizontal direction H can be a first tilt angle a. When the UAV is in the backward flight state, the tilt angle of the length direction L of the body 10 relative to the horizontal direction H can be a second inclination angle b. By setting the first tilt angle a to be smaller than the second inclination angle b, it is possible to ensure that in the hover state, the optical axis of the rear obstacle avoidance sensor 12 relative to the horizontal direction H has a greater angle compared to the backward flight state.

It should be noted that, in some embodiments described in this disclosure, the length direction L of the body 10 can be the direction connecting the nose F and the tail B of the UAV. The horizontal direction H can be a direction parallel to the horizon.

In some exemplary embodiments, in the hover state, the optical axis of the rear obstacle avoidance sensor 12 can be tilted towards a backward and upward direction of the body 10 relative to the horizontal direction H. This enables the rear obstacle avoidance sensor 12 located on the top part of the body 10 to have a clear view of the direct horizontal backward direction of the body 10 without being obstructed by the body 10. Moreover, since the rear obstacle avoidance sensor 12 is positioned on the top part of the body 10 and tilted towards a backward and upward direction of the body 10 relative to the horizontal direction H in the hover state, it can effectively detect obstacles located in the a backward and upward direction of the body 10. Consequently, the sensing range of the rear obstacle avoidance sensor 12 can be overall above a propeller plane of the rotor device 11 located at the tail B of the UAV. This arrangement fully resolves the issue of blind spots caused by the rotor device 11 obstructing the backward and upward view of the rear obstacle avoidance sensor 12, thereby enlarging the detection range of the rear obstacle avoidance sensor 12 and enhancing the overall obstacle avoidance capability of the UAV.

In some exemplary embodiments, the UAV may also include a front obstacle avoidance sensor 13, which is installed at the nose F of the central body 101 and is configured to detect obstacles in the direction towards the nose F of the UAV. In the hover state, the optical axis of the front obstacle avoidance sensor 13 can be tilted towards a forward and upward direction of the body 10 relative to the horizontal direction H, enabling it to detect obstacles in the forward and upward direction of the body 10. Compared to traditional techniques where front obstacle avoidance sensors can only detect obstacles directly in front of the UAV in the hover state, the arrangement of the front obstacle avoidance sensor 13 described herein further increases the UAV's detection range for obstacles, thereby enhancing the overall obstacle avoidance capability of the UAV.

In some exemplary embodiments, the UAV may also include a bottom obstacle avoidance sensor 14, which is installed on the bottom part of the central body 101 and is configured to detect obstacles below the bottom part of the UAV. In the hover state, the optical axis of the bottom obstacle avoidance sensor 14 can be tilted towards a forward and downward direction relative to the horizontal direction H, enabling it to detect obstacles in the forward and downward direction of the UAV. This allows the detection range of the bottom obstacle avoidance sensor 14 to overlap with that of the front obstacle avoidance sensor 13 in the forward and downward area relative to the horizontal direction H, reducing detection blind spots and increasing the UAV's overall detection range for obstacles, thereby enhancing its obstacle avoidance capability.

In some exemplary embodiments, the front obstacle avoidance sensor 13, the rear obstacle avoidance sensor 12 and the bottom obstacle avoidance sensor 14 can each include a binocular vision module. In practical applications, the binocular vision module can employ at least two cameras to observe a target and determine the relative distance between the target and the cameras by triangulation, thus achieving obstacle target detection, i.e., environmental perception. Typically, triangulating the distance to any target requires simultaneous observation by at least two cameras. In the UAV in some exemplary embodiments of the present disclosure, to achieve extensive environmental perception, at least three sets of binocular vision modules can be provided, covering multiple directions for triangulation detection. This arrangement expands the detection range for obstacles, enhancing the UAV's obstacle avoidance capability and, consequently, improving the UAV flight safety.

It should be noted that the front obstacle avoidance sensor 13, the rear obstacle avoidance sensor 12 and the bottom obstacle avoidance sensor 14 can also be sensors such as lidar (light detection and ranging) capable of obstacle detection. In some exemplary embodiments, specific details regarding the front obstacle avoidance sensor 13, the rear obstacle avoidance sensor 12 and the bottom obstacle avoidance sensor 14 are not limited.

Some exemplary embodiments of the present disclosure further provide a UAV, which specifically includes: a body 10, including a central body 101 and arms 102 mechanically coupled to the central body 101; and a plurality of rotor devices 11, respectively mounted on the arms 102 and configured to provide a flight power; where the arms 102 may specifically include front arms 1021 and rear arms 1022, the central body 101 may specifically include a first mounting portion 1011 located at a front end and a second mounting portion 1012 located at a rear end, the front arms 1021 are rotationally connected to the first mounting portion 1011, and the rear arms 1022 are rotationally connected to the second mounting portion 1012, the second mounting portion 1012 is higher than the first mounting portion 1011; the UAV has a hover state of stably hovering under a windless condition (as shown in FIG. 6) and a storage state for easy portability (as shown in FIGS. 9 and 10), in the hover state, the front arms 1021 and the rear arms 1022 are in an unfolded state relative to the central body 101, and in the storage state, the front arms 1021 and the rear arms 1022 are in a folded state relative to the central body 101; in the hover state, the front arms 1021 are higher than the rear arms 1022, and in the storage state, the front arms 1021 are positioned below the rear arms 1022.

In some exemplary embodiments of the present disclosure, due to the higher positioning of the front arms 1021 compared to the rear arms 1022 in the hover state of the UAV and the lower positioning the front arms 1021 compared to the rear arms 1022 in the storage state, the movement state of arms 102 is correlated with the attitude of the UAV, thereby facilitating the flight and storage of the UAV.

Specifically, when the UAV is in the hover state, the front arms 1021 are higher than the rear arms 1022. This arrangement allows the rotor device 11 connected to the front arms 1021 to be correspondingly higher than the rotor device 11 connected to the rear arms 1022. Consequently, this configuration helps reduce the resistance experienced by the UAV, thereby enhancing the UAV's flight efficiency.

Moreover, since the second mounting portion 1012 for mounting the rear arms 1022 is higher than the first mounting portion 1011 for mounting the front arms 1021, when the UAV is in the storage state, the front arms 1021 can be positioned below the rear arms 1022. This arrangement enables the staggered folding of the arms 102, reducing the volume required for storage of the UAV, thus facilitating its portability and transportation. Additionally, during the folding process of the front arms 1021 and the rear arms 1022, due to their staggered positioning in the vertical direction and the unchanged vertical order following the folding, there is no need to consider the folding sequence of the front arms 1021 and the rear arms 1022, so as to improve the folding efficiency and folding flexibility of the arms 102 of the UAV.

It should be noted that in the embodiments of the present disclosure, the term "height" specifically refers to the height in the height direction of the UAV.

In some exemplary embodiments, in the folded state, both the rear arms 1022 and the front arms 1021 can be attached to the side ends of the central body 101, and the propeller blades 111 of the rotor device 11 can be attached to the central body 101. This further reduces the volume of the UAV when it is in the storage state, facilitating its portability and transportation.

Some exemplary embodiments of the present disclosure further provide a UAV, which specifically includes: a body 10, including a nose F and a tail B opposite to the nose F; a gimbal 15, mounted at a front end of the nose F and specifically including a pitch shaft mechanism; a front obstacle avoidance sensor 12, mounted at the front end of the nose F and positioned above the gimbal 15 for detecting obstacles in a direction of the nose F of the UAV; and a camera 16, connected to the nose F of the body 10 via the gimbal 15 and configured to change a pitch angle thereof via the pitch shaft mechanism so as to allow the camera 16 to capture images above or below the body 10; where the nose F has an avoidance portion 1013 above the camera 16, the avoidance portion 1013 has a recess corresponding to the camera 16, the front obstacle avoidance sensor 13 is located on the avoidance portion 1013; the UAV has a hover state of stably hovering under a windless condition, and in the hover state, the body 10 is tilted in a length direction L relative to a horizontal direction H to make the nose F higher than the tail B, so as to allow the camera 16 to capture images through the recess of the avoidance portion 1013.

In some exemplary embodiment of this disclosure, due to the camera 16 being connected to the nose F of the body 10 via the gimbal 15, the camera 16 is able to change the pitch angle thereof via the pitch shaft mechanism. In addition, an avoidance portion 1013 is provided above the camera 16 on the nose F. In the hover state, with the body 10 tilted in the length direction L relative to the horizontal direction H and the nose F being higher than the tail B, the camera 16, driven by the gimbal 15, can capture images through the recess of the avoidance portion 1013, thereby improving the camera 16's pitch shooting range. In this way, by coordinating the gimbal 15's setting manner with the UAV's state, the camera 16's pitch angle shooting range is expanded, thereby improving the camera 16's aerial photography performance.

Specifically, when the UAV is in the hover state, the pitch shaft mechanism of the gimbal 15 can drive the camera 16 to change its pitch angle, aiming above or below the body 10 for shooting. When the camera 16 is directed above the body 10 for shooting, due to the avoidance portion 1013 being arranged above the nose F of the body 10, the existence of the avoidance portion 1013 can avoid the obstruction caused by the body 10 to the camera 16, expanding the pitch shooting range of the camera 16. This is beneficial for obtaining better aerial photography effects.

As shown in FIG. 9, the flight state can also include a forward flight state, where the UAV flies in the direction of the nose F. In this forward flight state, the length direction L of the body 10 is substantially parallel to the horizontal direction H, reducing the frontal area of the body 10 and consequently minimizing the resistance experienced by the body 10 during the forward flight. This enhances the flight efficiency of the UAV.

In practical applications, since the forward flight state is the primary operating state of the UAV, reducing the resistance experienced by the body 10 during this state can significantly decrease the UAV's energy consumption. This, in turn, improves the UAV's flight efficiency and enhances the user experience with the UAV.

In some exemplary embodiments, in the forward flight state, the UAV essentially flies at a target flight speed. In the hover state, the first tilt angle a of the length direction L of the body 10 relative to the horizontal direction H is related to the target flight speed. This allows for the adjustment of the first tilt angle a of the body 10 relative to the horizontal direction H based on the target flight speed during the hover state. Consequently, when the UAV flies forward at the target flight speed, the frontal area of the body 10 is minimized, thus the resistance experienced by body 10 is minimized. Since the UAV primarily flies at the target flight speed during forward flight, this greatly reduces the UAV's resistance during forward flight and decreases its energy consumption.

It should be noted that, in practical applications, the target flight speed can be set according to specific circumstances. For example, the target flight speed could be 10 meters per second, 12 meters per second, 15 meters per second, or any other value deemed appropriate. The embodiments of the present disclosure do not impose specific limitations on the exact value of the target flight speed.

In some exemplary embodiments, in the hover state, the first tilt angle a is related to a target coefficient, where the target coefficient is associated with the size and shape of the body 10. This implies that the value of the first tilt angle a needs to take into account the shape and size of the body 10, and the target coefficient can be determined based on the shape and size of the body 10. The target coefficient can be used to assess the influence of the shape and size of the body 10 on the first tilt angle a.

In practical applications, for the setting of the first tilt angle a, it takes into account both the target flight speed and the target coefficient, comprehensively evaluating the impact of the UAV's propulsion system and overall configuration. Therefore, the setting of the first tilt angle a is considered objective and scientific. This approach further reduces the UAV's energy consumption and improves its flight efficiency.

In some exemplary embodiments, the first tilt angle a is positively correlated with both the target coefficient and the target flight speed. That is, the larger the target flight speed, the larger the first tilt angle a correspondingly; the greater the target coefficient, the larger the first tilt angle a correspondingly. This is beneficial for calculating the first tilt angle a.

For example, the following provides a calculation formula for calculating the first tilt angle a:

$$a \approx k * v \qquad \text{(Formula 1)}$$

where a represents the first tilt angle a, k represents the target coefficient, the target coefficient is related to the shape and size of the body 10, and v represents the target flight speed when the UAV is in the forward flight state.

In some exemplary embodiments, in the hover state, the tilt angle of the length direction L of the body 10 relative to the horizontal direction H is between 5 degrees and 25 degrees, which is beneficial for the hover stability of the UAV when it is in the hover state.

Exemplarily, the first tilt angle a can be set according to actual circumstances. For instance, the first tilt angle a can be 10 degrees, 15 degrees, or 18 degrees, etc. The embodiments of the disclosure do not limit the specific value of the first tilt angle a.

In some exemplary embodiments of this disclosure, the flight state can also include a forward flight state in which the UAV flies in the direction of nose F, and a backward flight state in which the UAV flies in the direction of the tail B. As shown in FIG. 8, in the forward flight state, a first optical axis D1 of the front obstacle avoidance sensor 13 can be tilted forward and downward relative to the horizontal direction H, in order to detect obstacles in the forward and downward direction relative to the horizontal direction H; a second optical axis D2 of the bottom obstacle avoidance sensor 14 can be tilted backward and downward relative to the horizontal direction H, in order to detect obstacles in the backward and downward direction relative to the horizontal direction H; a third optical axis D3 of the rear obstacle avoidance sensor 12 can be tilted backward and upward relative to the horizontal direction H, in order to detect obstacles in the backward and upward direction relative to the horizontal direction H. In this way, through the combined use of the front obstacle avoidance sensor 13, the bottom obstacle avoidance sensor 14 and the rear obstacle avoidance sensor 12, omnidirectional obstacle avoidance can be achieved for the UAV in the forward flight state, thereby enhancing the obstacle avoidance function of the UAV.

As shown in FIG. 7, in the backward flight state, the first optical axis D1 of the front obstacle avoidance sensor 13 can be tilted in the forward and upward direction relative to the horizontal direction H, in order to detect obstacles in the forward and upward direction relative to the horizontal direction H; the second optical axis D2 of the bottom obstacle avoidance sensor 14 can be tilted in the forward and downward direction relative to the horizontal direction H, in order to detect obstacles in the forward and downward direction relative to the horizontal direction H; the third optical axis D3 of the rear obstacle avoidance sensor 12 can be tilted in the backward direction relative to the horizontal direction H, in order to detect obstacles in the backward direction relative to the horizontal direction H. In this way, with the combined use of the front obstacle avoidance sensor 13, the bottom obstacle avoidance sensor 14 and the rear obstacle avoidance sensor 12, omnidirectional obstacle avoidance can be achieved for the UAV in the backward flight state, thereby enhancing the obstacle avoidance performance of the UAV.

In some exemplary embodiments, in the backward flight state, the third optical axis D3 of the rear obstacle avoidance sensor 12 can be oriented to be substantially parallel to the horizontal direction H. This configuration ensures that, when the UAV is in the backward flight state, the angle between the optical axis of the rear obstacle avoidance sensor 12 and the horizontal direction H is relatively small. Consequently, this facilitates better detection of obstacles in the UAV's forward direction by the rear obstacle avoidance sensor 12, allowing for a larger obstacle avoidance field of view or better directional angles, thus enhancing the UAV's obstacle avoidance capabilities.

In some exemplary embodiments, the front obstacle avoidance sensor 13 has a first perception coverage area S1, the bottom obstacle avoidance sensor 14 has a second perception coverage area S2, and the rear obstacle avoidance sensor 12 has a third perception coverage area S3. The second optical axis D2 of the bottom obstacle avoidance sensor 14 is tiled in a forward and downward direction relative to the length direction L of the central body 101, such that the second perception coverage area S2 partially overlaps with at least a portion of the first perception coverage area S1. In practical applications, since the second perception coverage area S2 partially overlaps with at least a portion of the first perception coverage area S1, it helps reduce the UAV's obstacle detection blind spots, enabling omnidirectional obstacle avoidance detection. This is beneficial for enhancing the UAV's obstacle avoidance capabilities.

As shown in FIG. 7, the first perception coverage area S1 includes a first upper boundary S11 and a first lower boundary S12; the second perception coverage area S2 includes a first front boundary S21 and a first rear boundary S22. The first lower boundary S12 partially overlaps with the first front boundary S21 to avoid potential blind spots in obstacle detection between the front obstacle avoidance sensor 13 and the bottom obstacle avoidance sensor 14 as much as possible. This arrangement enables c omnidirectional obstacle avoidance detection, thereby enhancing the UAV's obstacle avoidance capabilities.

In some exemplary embodiments, the overlapping angle between the first lower boundary S12 and the first front boundary S21 is less than or equal to 5 degrees. This not only reduces potential blind spots in obstacle detection between the front obstacle avoidance sensor 13 and the bottom obstacle avoidance sensor 14, but also minimizes the impact of the overlap between the first lower boundary S12 and the first front boundary S21 on the overall detection perspective of the UAV. It is beneficial for enhancing the overall obstacle avoidance capability of the UAV.

In some exemplary embodiments, the third optical axis D3 of the rear obstacle avoidance sensor 12 is tilted in an upward direction relative to the length direction L of the central body 101. This allows the rear obstacle avoidance sensor 12 located on the top part of body 10 to have a better view in the direct horizontal backward direction of the body 10 without being obstructed by the body 10. Moreover, since the rear obstacle avoidance sensor 12 is positioned on the top part of the body 10, its sensing range can be overall higher than the propeller plane of the rotor device 11 located at the tail B. This fully solves the issue of blind spots caused by the slanted upward view of the rear obstacle avoidance sensor 12 being obstructed by the rotor device 11, thus increasing the detection range of the rear obstacle avoidance sensor 12 and enhancing the overall obstacle avoidance capability of the UAV.

In some exemplary embodiments, the angle at which the third optical axis D3 is tilted upward relative to the horizontal direction H is less than or equal to 30 degrees. This ensures that regardless of the UAV's attitude, the optical axis of the rear obstacle avoidance sensor 12 can always be oriented towards the tail B of the UAV.

It should be noted that in practical applications, the angle at which the third optical axis D3 is tilted upwards relative to the horizontal direction H can be adjusted according to specific circumstances. For example, it could be set to 5 degrees, 7 degrees, or 10 degrees, etc. The embodiments of the present disclosure does not limit a specific tilt angle of the third optical axis D3 relative to the horizontal direction H.

In some exemplary embodiments, the first optical axis D1 of the front obstacle avoidance sensor 13 is oriented to be substantially parallel to the length direction L of the central body 101, allowing the front obstacle avoidance sensor 13 to continuously detect obstacles in the direction of the UAV's nose F. In practical applications, when the first optical axis D1 of the front obstacle avoidance sensor 13 is substantially parallel to the length direction L of the central body 101, the installation of the front obstacle avoidance sensor 13 can be referenced to the horizontal direction H, thereby improving the accuracy and efficiency of its installation.

In some exemplary embodiments, the rear obstacle avoidance sensor 12 can be positioned close to the front obstacle avoidance sensor 13. In practical applications, since the front obstacle avoidance sensor 13 is mounted at the nose F of the body 10, positioning the rear obstacle avoidance sensor 12 close to the front obstacle avoidance sensor 13 allows the rear obstacle avoidance sensor 12 to be as close as possible to the nose F of the body 10. This minimizes the obstruction caused by the rotor device 11 in the direction of tail B of the body 10, thereby increasing the detection range of the rear obstacle avoidance sensor 12.

In some exemplary embodiments, both the rear obstacle avoidance sensor 12 and the front obstacle avoidance sensor 13 are mounted on the top part of the body 10, and the distance between the rear obstacle avoidance sensor 12 and the front obstacle avoidance sensor 13 is less than a first threshold value. This ensures that the rear obstacle avoidance sensor 12 is positioned as close as possible to the front obstacle avoidance sensor 13.

It should be noted that in practical applications, the specific value of the first threshold value can be adjusted according to actual circumstances. For example, the first threshold value could be set to 5 millimeters, 8 millimeters, or 20 millimeters, etc. The embodiments of the present disclosure do not limit a specific value for the first threshold value.

In some exemplary embodiments, the body 10 may also be equipped with a support 103, on which both the front obstacle avoidance sensor 13 and the rear obstacle avoidance sensor 12 are mounted. This arrangement allows the front obstacle avoidance sensor 13 and the rear obstacle avoidance sensor 12 to share a single support 103, reducing the number of support 103 required for mounting obstacle avoidance sensors of the UAV. It also minimizes the space occupied by the support 103 on the body 10, thereby facilitating the overall component layout of the body 10.

In some exemplary embodiments of this disclosure, the cross-sectional shape of the propeller blade 111 along the rotation direction of the rotor device 11 can be arc-shaped, with a side closer to the forward rotation direction being lower than a side farther away from the forward rotation direction, in order to reduce the wind resistance of the propeller blade 111 during rotation and improve the rotation efficiency of the rotor device 11. An arc-shaped portion 104 is provided at a top part of a side end of the central body 101. In the folded state, the propeller blades 111 on the rear arms 1022 are attached to the arc-shaped portion 104 so that the propeller blade 111 on the rear arms 1022 fully attach to the arc-shaped portion 104 of the central body 101, reducing the size of the UAV after folding, which can facilitate the carrying and transportation of the UAV.

In some exemplary embodiments, the front arms 1021 may specifically include a left front arm 10211 and a right front arm 10212, with the rotor device 11 installed on the left front arm 10211 being the left front rotor device 112, and the rotor device 11 installed on the right front arm 10212 being the right front rotor device 113; the rear arms 1022 may specifically include a left rear arm 10221 and a right rear arm 10222, with the rotor device 11 installed on the left rear arm 10221 being the left rear rotor device 114, and the rotor device 11 installed on the right rear arm 10222 being the right rear rotor device 115. The rotation direction of the left front rotor device 112 and that of the right rear rotor device 115 are both a first rotation direction, and the rotation direction of the right front rotor device 113 and that of the left rear rotor device 114 are both a second rotation direction, where the second rotation direction is opposite to the first rotation direction.

In practical applications, in the case where the rotation directions of the left front rotor device 112 and the right rear rotor device 115 are the same, the rotation directions of the right front rotor device 113 and the left rear rotor device 114 are the same, and the rotation directions of the left front rotor device 112 and the right front rotor device 113 are opposite, it allows for the left front rotor device 112, the right rear rotor device 115, the right front rotor device 113 and the left rear rotor device 114 to collectively provide lift for the UAV.

It should be noted that the first rotation direction can be clockwise, and the second rotation direction can be counterclockwise. Alternatively, the first rotation direction can be counterclockwise, and the second rotation direction can be clockwise. The embodiments of this disclosure do not specifically limit the first rotation direction and the second rotation direction.

Specifically, in the folded state, the propeller blade 111 on the left rear rotor device 114 is attached to the arc-shaped portion 104 at the top part on the left side of the central body 101, while the propeller blade 111 on the right rear rotor device 115 is attached to the arc-shaped portion 104 at the top part on the right side of the central body 101. In practical applications, by attaching the propeller blades 111 on the left rear rotor device 114 and the right rear rotor device 115 to the top parts on the left and right sides of the arc-shaped portion 104 of the central body 101, not only can the propeller blades 111 be fully attached to the central body 101, reducing the volume of the propeller blades 111 after folding, but it also facilitates the staggered folding of the rear arms 1022 and the front arms 1021 on the sides of the central body 101. This further reduces the volume of the UAV's arms 102 after folding, making it easier for the UAV to be stored, carried, and transported.

In some exemplary embodiments, the first rotation direction may be clockwise, meaning that the rotation direction of the right rear rotor device 115 is clockwise. Consequently, in the clockwise direction, the cross-sectional shape of the propeller blade 111 on the right rear rotor device 115 is arc-shaped with a lower height on the side closer to the forward direction. In this way, when the propeller blade 111 on the right rear rotor device 115 is folded and stored at the top part on the right side of the central body 101, the cross-sectional shape of the propeller blade 111 on the right rear rotor device 115 can fit to the shape of the arc-shaped portion 104 at the top part on the right side of the central body 101. This facilitates improving the fit between the propeller blade 111 on the right rear rotor device 115 and the arc-shaped portion 104 at the top part on the right side of the central body 101, further reducing the volume after the propeller blade 111 is folded and stored.

Similarly, the second rotation direction may be counterclockwise, meaning that the rotation direction of the left rear rotor device 114 is counterclockwise. Consequently, in the counterclockwise direction, the cross-sectional shape of the propeller blade 111 on the left rear rotor device 114 is arc-shaped with a lower height on the side closer to the forward direction. In this way, when the propeller blade 111 on the left rear rotor device 114 is folded and stored at the top part on the left side of the central body 101, the cross-sectional shape of the propeller blade 111 on the left rear rotor device 114 can match the shape of the arc-shaped portion 104 at the top part on the left side of the central body 101. This facilitates improving the fit between the propeller blade 111 on the left rear rotor device 114 and the arc-shaped portion 104 at the top part on the left side of the central body 101, further reducing the volume after the propeller blade 111 is folded and stored.

It should be noted that in the embodiments described in this disclosure, "left" refers to the left side of the UAV when facing the nose F direction. Similarly, "right" refers to the right side of the UAV when facing the nose F direction.

In some exemplary embodiments of this disclosure, during the folding process of the front arms 1021 and the rear arms 1022, the rear arms 1022 fold along a side of the center body 101 towards the nose F direction, and the front arms 1021 fold along a side of the center body 101 towards the tail B direction, in order to further reduce interference between the front arms 1021 and the rear arms 1022 during the folding process. In practical applications, the rear arms 1022 can be folded first along the side of the center body 101 towards the nose F direction, and then the front arms 1021 can be folded along the side of the center body 101 towards the tail B direction, so as o avoid the landing gear of the front arms 1021 affecting the folding of the rear arms 1022.

It should be noted that in some embodiments of this disclosure, since the rear arms 1022 are higher than the front arms 1021, the rear arms 1022 and the front arms 1021 can achieve staggered folding vertically. Therefore, in practical applications, there is no need to consider the folding sequence of the front arms 1021 and the rear arms 1022, thereby greatly improving the folding flexibility of the arms 102.

In some exemplary embodiments of this disclosure, the UAV may also include a landing gear; the bottom part of the center body 101 is provided with a landing gear connection portion 105; the landing gear connection portion 105 specifically includes two front landing gear connection portions 1051 and two rear landing gear connection portions 1052. In the folded state, the propeller blades 111 on the front arms 1021 can be retracted between the two front landing gear connection portions 1051. In this way, on the one hand, it is convenient to store the propeller blades 111 on the front arms 1021 at the bottom part of the center body 101, further reducing the volume after the propeller blades 111 are folded and stored. On the other hand, the propeller blades 111 on the front arms 1021 can also be limited by the two front landing gear connection portions 1051, preventing the propeller blades 111 on the front arms 1021 from disengaging from the bottom part of the center body 101, thereby improving the reliability of storing the propeller blades 111.

In some exemplary embodiments, in the folded state, the rear landing gear connection portions 1052 can be the rotor mounting portion on the front arms 1021, so as to avoid separately setting the rear landing gear connection portions 1052 at the bottom part of the center body 101. In practical applications, in the folded state, since the front arms 1021 fold toward the tail B direction and the front arms 1021 are located below the rear arms 1022, the rotor mounting portions on the front arms 1021 for mounting the rotor device 11 can correspondingly fold toward the tail B direction and be close to the bottom part of the center body 101. At this time, the rotor mounting portions on the front arms 1021 can serve as the rear landing gear connection portions 1052, so as to avoid the additional operation of separately setting the rear landing gear connection portions 1052 at the bottom part of the center body 101, simplifying the structure of the center body 101, and being beneficial to the layout of components at the bottom part of the center body 101.

Similarly, in the unfolded state, the rear landing gear connection portions 1052 can be protruding portions extending from the center body 101, so as to avoid the additional operation of separately setting the rear landing gear connection portions 1052 at the bottom part of the center body 101, simplifying the structure of the center body 101, and being beneficial to the layout of components at the bottom part of the center body 101.

In some exemplary embodiments of the present disclosure, the bottom part of the center body 101 is also provided with a battery case 106, and the protruding portion can be a part of the battery case 106. In practical applications, the UAV usually needs a battery to drive the rotor devices 11 to rotate, so as to provide flight power for the UAV. In order to protect the battery, a battery case 106 typically needs to be provided outside the battery. Since the volume of the battery is relatively large and usually needs to be arranged at the bottom part of the center body 101, the battery case 106 is typically arranged at the bottom part of the center body 101 and protrudes from the bottom part of the center body 101.

In some exemplary embodiments of this disclosure, since the battery case 106 protrudes from the bottom part of the center body 101, the battery case 106 can serve as the rear landing gear connection portion 1052, so as to avoid the additional operation of separately setting the rear landing gear connection portion 1052 at the bottom part of the center body 101, simplifying the structure of the center body 101, and being beneficial to the layout of components at the bottom part of the center body 101.

In some exemplary embodiments, when the front arms 1021 and the rear arms 1022 are in the unfolded state, the rotation axis 116 of the rotor device 11 is tilted relative to the height direction of the center body 101. In practical applications, when the rotor device 11 is rotating, the rotor device 11 can generate an upward lift force F along the rotation axis 116. Since the rotation axis 116 is tilted relative to the height direction of the center body 101, the lift force F can be decomposed into a horizontal component force F1 and a vertical component force F2. Specifically, the vertical component force F2 can provide the flight lift for the UAV, while the horizontal component force F1 can provide the yaw force for the UAV, thereby achieving a better yaw control effect.

In some exemplary embodiments, the rotation axis 116 of rotor device 11 is tilted outward relative to the height direction of the central body 101. This allows the horizontal component force F1 to correspondingly point towards a direction away from the central body 101, achieving sustained and stable yaw force, thus beneficial for further enhancing the yaw control effectiveness of the UAV.

For example, the tilting of the rotation axis 116 of the rotor device 11 outward relative to the height direction the central body 101 can specifically include: tilting the rotation axis 116 towards the nose direction F relative to the central body 101, tilting it towards the tail B direction, or tilting it to the left or right sides. The embodiments of this disclosure do not limit the tilting manner of the rotation axis 116.

In some exemplary embodiments, the top part of the rotation axis 116 of the rotor device 11 can be tilted towards both sides of the central body 101, i.e., the rotation axis 116 of the left front rotor device 112 and that of the left rear rotor device 114 are tilted towards the left side of the central body 101, and the rotation axis 116 of the right front rotor device 113 and that of the right-rear rotor device 115 are tilted towards the right side of the central body 101. As shown in FIG. 3, when viewed from the front of the UAV to the rear, the lift F direction of the propeller blade 111 of the rotor device 11 is tilted towards both left and right sides away from the central body 101. In this case, the horizontal component force F1 is entirely in the left and right direction. In this way, the stability of the yaw force can be further improved, and the impact of the tilted rotation axis 116 on the attitude of the UAV can be reduced. Therefore, it is possible to enhance the flight stability of the UAV while achieving yaw control.

In some exemplary embodiments, the tilt angle range of the rotation axis 116 relative to the vertical direction of the central body 101 may be from 5 degrees to 7 degrees, in order to achieve better yaw control torque while reducing the impact of the tilted rotation axis 116 on the vertical component force F2, thus balancing both effective yaw control and flight stability.

In some exemplary embodiments of the present disclosure, the camera 16 can be movably connected to the central body 101 via the gimbal 15. Specifically, the gimbal 15 can include a pitch shaft 151, a yaw shaft, and a roll shaft, and the camera 16 can move around the pitch shaft 151, the yaw shaft, and the roll shaft respectively. In practical applications, by rotating the camera 16 around the pitch shaft 151, the yaw shaft and the roll shaft, the shooting range of the camera 16 can be adjusted, thereby improving the aerial photography effect of the camera 16.

In some exemplary embodiments, the gimbal 15 and the camera 16 are both connected to the front end of the central body 101, and the avoidance portion 1013 can be arranged on the top part of the central body 101 to at least partially avoid the gimbal 15 and the camera 16. This allows the camera 16 to be positioned in a recess of the avoidance portion 1013 when the gimbal 15 lifts the camera 16 upward for shooting, thereby increasing the pitch shooting range of the camera 16.

In some exemplary embodiments, the front end of the central body 101 may also be equipped with two protrusions extending towards the direction of the nose F, with a gap set between the two protrusions. One end of the pitch shaft 151 is suspended from one of the protrusions, while the other end of the pitch shaft 151 is suspended from the other protrusion. The gimbal 15 and the camera 16 are both located between these two protrusions. This arrangement facilitates the respective connection of the pitch shaft 151 to the central body 101 at both ends thereof, thus enhancing the reliability of the connection of the pitch shaft 151 to the central body 101. By connecting the pitch shaft 151 to both sides of the camera 16, the support reliability of the pitch shaft 151 for the camera 16 can also be improved. Consequently, the stability of the shooting process during the pitch adjustment of the camera 16 can be improved.

In some exemplary embodiments, the pitch shaft 151 can be a "U"-shaped pitch shaft, where the two ends of the "U"-shaped pitch shaft are respectively suspended from the protrusions. An arc-shaped section of the "U"-shaped pitch shaft can be used to form an accommodating space for accommodating the camera 16. The "U"-shaped pitch shaft can effectively avoid interference with the camera 16, allowing the camera 16 to rotate within the housing space of the "U"-shaped pitch shaft, thus avoiding interference between the camera 16 and the central body 101. Consequently, the maneuverability of the camera 16 can be improved.

In summary, the UAV in some exemplary embodiments of the present disclosure may have the following advantages.

In some exemplary embodiments of this disclosure, as the body is tilted in the length direction relative to the horizontal direction in the hover state, the nose becomes higher than the tail; accordingly, the body of the UAV can tilt backward by a certain angle relative to the horizontal direction to reduce the resistance it encounters. Consequently, this design helps enhance the flight efficiency of the UAV. Additionally, by installing the rear obstacle avoidance sensor on the top part of the body and adjusting its optical axis to have a greater tilt angle relative to the horizontal direction in the hover state compared to the backward flight state, the position of the rear obstacle avoidance sensor can be optimized concerning the flight and hover attitude of the body. This configuration provides a larger obstacle avoidance view angle or a better directional angle for the rear obstacle avoidance sensor. Ultimately, this contributes to improving the overall obstacle avoidance functionality of the UAV and enhances the flight experience thereof.

The device embodiments described above are merely illustrative. The units described as separate components can be physically separate or not. Components shown as units can be physical units or not, that is, they can be located in one place or distributed across multiple network units. It is possible to select some or all modules as needed to achieve the objects of the embodiments of the present disclosure. A person skilled in the art can understand and implement the present disclosure without any creative efforts.

The term "an embodiment," "embodiments," or "one or more embodiments" as used herein refers to that particular features, structures, or features described in connection with the embodiment(s) are included in at least one embodiment of the present disclosure. In addition, please note that the examples of the word "in one embodiment" herein do not necessarily all refer to the same embodiment.

In this disclosure, numerous specific details are provided. However, it is understood that embodiments of the present disclosure can be practiced without these specific details. In some instances, well-known methods, structures and technologies are not described in detail to avoid obscuring understanding of this disclosure.

In the claims, any reference symbols placed in parentheses should not be construed as limiting the claims. The word "comprising" does not exclude the presence of elements or steps not listed in the claims. The word "a" or "an" preceding an element does not exclude the presence of multiple such elements. The present disclosure may be implemented with hardware including several different components and/or with a computer programmed appropriately. In the unit claims enumerating a number of devices, some of the units may be embodied by the same hardware item. The use of the terms "first," "second," "third," etc., does not imply any particular order, and these terms can be interpreted as titles.

Finally, it should be noted that the above embodiments are only intended to illustrate the technical solutions of the present disclosure, rather than limiting it. Although detailed descriptions of the present disclosure have been provided with reference to the aforementioned embodiments, a person skilled in the art would understand that the technical solutions described in the above embodiments can be modified or some technical features can be substituted with equivalent ones. These modifications or substitutions do not depart from the essence of the technical solutions of the embodiments of the present disclosure, and all fall within the principles and scope of the technical solutions of the embodiments of the present disclosure.

What is claimed is:

1. An aircraft, comprising:

a body, including a nose and a tail opposite to the nose;

a driving power device, coupled to the body to provide driving power; and a sensor, mounted on the body and configured to detect in a flight direction of the aircraft, wherein in response to a horizontal flight state instruction, the driving power device provides a first flight power to enable the aircraft to fly in a horizontal direction, in response to a hover state instruction, the driving power device provides a second flight power to enable the aircraft to hover stably in an environment without wind interference, a tilt angle between an optical axis of the sensor and the horizontal direction when the aircraft is in a hover state is greater than a tilt angle between the optical axis of the sensor and the horizontal direction when the aircraft is in a horizontal flight state.

2. The aircraft according to claim 1, wherein the horizontal flight state includes a backward flight state of flying toward a tail direction of the aircraft, the sensor is a rear sensor, and the rear sensor is configured to detect toward the tail direction of the aircraft.

3. The aircraft according to claim 2, wherein in the backward flight state, a tilt angle between the optical axis of the sensor and the horizontal direction when the aircraft is in the hover state is greater than a tilt angle between the optical axis of the sensor and the horizontal direction when the aircraft is in the backward flight state.

4. The aircraft according to claim 2, wherein the aircraft further comprises a front sensor configured to detect in a nose direction of the aircraft, and in the backward flight state, an optical axis of the front sensor is tilted in a forward and upward direction relative to the horizontal direction; or the aircraft further comprises a bottom sensor configured to detect in a downward direction, and in the backward flight state, an optical axis of the bottom sensor is tilted in a forward and downward direction relative to the horizontal direction.

5. The aircraft according to claim 2, wherein an optical axis of the rear sensor is configured to be substantially parallel to the horizontal direction.

6. The aircraft according to claim 2, wherein in the hover state, an optical axis of the rear sensor is toward backward and upward relative to a horizontal direction.

7. The aircraft according to claim 1, wherein the aircraft further comprises a front sensor configured to detect in a nose direction of the aircraft;

in the hover state, an optical axis of the front sensor is tilted in a forward and upward direction relative to the horizontal direction.

8. The aircraft according to claim 1, wherein the aircraft further comprises a bottom sensor configured to detect in a downward direction;

in the hover state, an optical axis of the bottom sensor is tilted in a forward and downward direction relative to the horizontal direction.

9. The aircraft according to claim 1, wherein the horizontal flight state includes a forward flight state of flying in a nose direction of the aircraft;

in the forward flight state, a roll axis direction of the body is substantially parallel to the horizontal direction.

10. The aircraft according to claim 9, wherein in the forward flight state, the aircraft flies at a target flight speed.

11. The aircraft according to claim 1, wherein in the hover state, a first tilt angle of a roll axis direction of the body relative to the horizontal direction is related to the target flight speed.

12. The aircraft according to claim 11, wherein in the hover state, the first tilt angle of the roll axis of the body relative to the horizontal direction is between 5 degrees and 25 degrees.

13. The aircraft according to claim 1, wherein the aircraft further comprises a front sensor configured to detect in a nose direction of the aircraft, and a bottom sensor configured to detect in a downward direction.

14. The aircraft according to claim 1, wherein the horizontal flight state includes a forward flight state of flying in a nose direction, and an optical axis of a rear sensor is toward backward and upward relative to a horizontal direction.

15. The aircraft according to claim 14, wherein in the forward flight state, an optical axis of a front sensor is tilted toward forward and downward relative to the horizontal direction;

in the forward flight state, an optical axis of the bottom sensor is tilted backward and downward relative to the horizontal direction.

16. The aircraft according to claim 1, wherein a front sensor has a first perception coverage area, a bottom sensor has a second perception coverage area;

an optical axis of the bottom sensor is tilted forward and downward relative to a roll axis direction of a central body of the body to ensure that the second perception coverage area overlaps at least partially with the first perception coverage area.

17. The aircraft according to claim 16, wherein the first perception coverage area has a first upper boundary and a first lower boundary, the second perception coverage area has a first front boundary and a first rear boundary, and the first lower boundary overlaps at least partially with the first front boundary.

18. The aircraft according to claim 17, wherein an overlapping angle between the first lower boundary and the first front boundary is less than or equal to 5 degrees.

19. The aircraft according to claim 1, wherein an optical axis of a rear sensor is tilted upward relative to a roll axis direction of a central body of the body.

* * * * *